(12) United States Patent
Giambalvo et al.

(10) Patent No.: US 9,946,768 B2
(45) Date of Patent: Apr. 17, 2018

(54) DATA RENDERING OPTIMIZATION (75) Inventors: Daniel Giambalvo, Seattle, WA (US); Leonard M. Kawell, Kirkland, WA (US); Timothy R. Sullivan, Redmond, WA (US); Benjamin Vanik, Seattle, WA (US); Brett D. Brewer, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 834 days.

(21) Appl. No.: 12/938,229

(22) Filed: Nov. 2, 2010

(65) Prior Publication Data

US 2012/0110002 A1 May 3, 2012

(51) Int. Cl.
G06F 7/00 (2006.01)
G06F 17/30 (2006.01)
G06F 17/24 (2006.01)

(52) U.S. Cl.
CPC ...... G06F 17/30554 (2013.01); G06F 17/248 (2013.01); G06F 17/30477 (2013.01); G06F 17/30572 (2013.01); G06F 17/30994 (2013.01)

(58) Field of Classification Search
CPC .................................................. G06F 17/248
USPC ........................................................ 707/779
See application file for complete search history.

(56) References Cited

U.S. PATENT DOCUMENTS 6,581,054 B1 * 6/2003 Bogrett
6,601,064 B1 * 7/2003 Nag et al.
7,516,124 B2 4/2009 Kasperski
2004/0088375 A1 5/2004 Sethi et al.
2008/0059486 A1 3/2008 Pappas
2008/0307300 A1 * 12/2008 Kitayama et al. ............ 715/234
2009/0077371 A1 * 3/2009 Powell et al. ................. 713/152

OTHER PUBLICATIONS

Li, et al., "AMP: An Affinity-based Metadata Prefetching Scheme in Large-Scale Distributed Storage Systems", retrieved on Jul. 27, 2010 at <<http://ponca.unl.edu/facdb/csefacdbiTechReportArchive/TR-UNL-CSE-2007-0024.pdf>>, University of Nebraska, Computer Science and Engineering Department, Technical Report TR-UNL-CSE-2007-0024, Nov. 19, 2007, pp. 1-9.
Manning, et al., "An Introduction to Information Retrieval", retrieved on Jul. 27, 2010 at <<http://dspace.cusat.ac.in/dspace/bitstream/12345678912538/1/InformationRetrieval.pdf>>, Cambridge University Press, Apr. 1, 2009, pp. 1-581.
Meng, et al., "Data Search Engine", retrieved on Jul. 27, 2010 at <<http://www.cs.binghamton.edu/~meng/pub.d/DataSE2009.pdf>>, John Wiley & Sons, Wiley Encyclopedia of Computer Science and Engineering, Section "D", 2008, pp. 1-8.

(Continued)

*Primary Examiner* — Ajith Jacob
(74) *Attorney, Agent, or Firm* — Drinker Biddle & Reath LLP (57) ABSTRACT Optimizing data rendering includes, in one embodiment, using templates to express a data request as a set of queries where each query in the set is prioritized based on, among other things, context factors such as capabilities of the requesting device, network factors, and user context. After generating the set of queries, each query in the set of queries is then executed to progressively populate the template with the requested data. As the queries are executing, the templates are progressively rendered.

13 Claims, 8 Drawing Sheets

(56) References Cited

OTHER PUBLICATIONS

Venketesh, et al., "Semantic Web Prefetching Scheme Using Naive Bayes Classifier", retrieved on Jul. 27, 2010 at <<http://www.tmrfindia.org/ijcsa/v7i14.pdf>>, Technomathematics Research Foundation, International Journal of Computer Science and Applications, vol. 7, No. 1, Jan. 2010, pp. 66-78.

Yang, et al., "Intelligent Mobile Agents for Information Retrieval and Knowledge Discovery from Distributed Data and Knowledge Sources", retrieved on Jul. 27, 2010 at <<http://citeseerx.ist.psu.edu/viewdoc/download;jsessionid=7E1B3934029811E99DFB1B006D0416F3?doi=10.1.1.51.7105&rep=rep1&type=pdf>>, IEEE, Proceedings of Information Technology Conference, Syracuse, NY, Sep. 1998, pp. 99-102.

"Non Final Office Action Issued in U.S. Appl. No. 15/240,646", Dated Jun. 30, 2017, 7 Pages.

"Final Office Action Issued in U.S. Appl. No. 15/240,646", Dated Oct. 5, 2017, 6 Pages.

"Non Final Office Action Issued in U.S. Appl. No. 15/240,646", Dated Dec. 28, 2017, 6 Pages.

\* cited by examiner

DATA RENDERING OPTIMIZATION

BACKGROUND

Data rendering generally pertains to displaying data using a computer. For example, a user who is interested in purchasing a television may use data rendering techniques to browse through web pages of televisions which are available from an on-line product catalog. However, the amount of data that is available to users is constantly increasing. Whereas at one point, the data may have only included a title, description, and price of the product, users are now also presented with reviews, ratings, alternative and related products, pictures, comments, targeted ads, etc. At the same time, the types of computers are also diversifying. Whereas once users might primarily use a Personal Computer, they are now increasingly using netbooks, tablets, smart phones, etc. to view the same content.

In prior implementations, applications would use techniques created by developers during a design phase to determine what data to return to render. For example, if the data request is a request to view search results from a search engine such as Google®, then in previous data rendering techniques a user of a desktop computer may use a first application (e.g., www.google.com) to view search results while a user of a mobile device will have to use a second application (e.g., www.m.google.com) to view the search results. Accordingly, in such previous data rendering techniques, a developer would have to create the two different applications (e.g., www.google.com and www.m.google.com) in order to accommodate users who operate client devices of varying technology.

However, due to the increasing amount of data that is available and the diversifying type of computers which are requesting data, such techniques may place an undesirable burden on the developers, the computers and/or the data transmission network.

SUMMARY

This application describes techniques and systems for optimizing data rendering. Unlike previous methods, which utilize customized applications to render requested data, the data rendering optimization techniques described herein adopt an optimization approach that fetches and/or renders the requested data in accordance with a prioritization of the requested data such as capabilities of the requesting device (e.g., wattage, display resolution, display size (e.g., pixel size), memory, central processing unit (CPU) capabilities, battery life), network factors (e.g., network connection, network resources, network congestion, etc.), user context (e.g., time of day/month/year, season, upcoming holidays, location of requesting device, zoom commands, properties indicated as having higher priority by the user, etc.), etc.

The data rendering optimization techniques employ a data rendering optimization system to service a data request from a requesting device. The data rendering optimization system may then optimize data rendering of the requested data using information included in the data request. For instance, the data request may include an object identifier identifying what data is requested, a template identifying what type of data should be rendered in response to the data request, and the context factors.

The data rendering optimization system may then service the data request using the following illustrative techniques. First, the data rendering optimization system may use the template to formulate a set of queries which, when executed, populate the template with data. In some instances, the set of queries are prioritized based on one or more of the context factors. For example, if the requesting device is a mobile device, then the data rendering optimization system may give higher priority to text-based data (e.g., title and price) and lower priority to image-based data (e.g., pictures or start ratings). As another example, if the user indicates a desire to view the requested data sorted by price, then the data rendering optimization system may give the price properties a higher priority. Second, the data rendering optimization system may execute the queries one at a time to progressively populate the template with the requested data. Finally, the data rendering optimization system may communicate the template to the requesting device as it is being populated to progressively render the requested data.

In some instances, the data rendering optimization system may formulate the set of queries after design time based on the context factors. Accordingly, the data rendering optimization techniques discussed herein may be applied to any application and any client device.

BRIEF DESCRIPTION OF THE DRAWINGS

The detailed description is described with reference to the accompanying figures. In the figures, the left-most digit(s) of a reference number identifies the Figure in which the reference number first appears. The use of the same reference number in different figures indicates similar or identical items.

DETAILED DESCRIPTION

As noted above, due to the constantly increasing amount of data that is available to users as well as the diversifying type of computing devices used to request data, it is often difficult for computing devices to efficiently perform data rendering techniques.

The embodiments described herein pertain to optimizing data rendering by progressively fetching and rendering the requested data. Rather than rendering data in a same manner for any device type, this disclosure describes rendering data based on, among other things, context factors such as capabilities of the requesting device, network factors, and user context.

As used herein, capabilities of the requesting device may include, among other things, wattage, display resolution, display size (e.g., pixel size), memory, central processing unit (CPU) capabilities, and battery life. As used herein, network factors may include, among other things, network connection, network resources, and network congestion. As used herein, user context may include, among other things, time of day/month/year, season, upcoming holidays, location of requesting device, zoom commands, and properties indicated as having higher priority by the user.

The techniques and systems described herein may be implemented in a number of ways. Example implementations are provided below with reference to the following figures.

Illustrative Scheme

Figure 1:
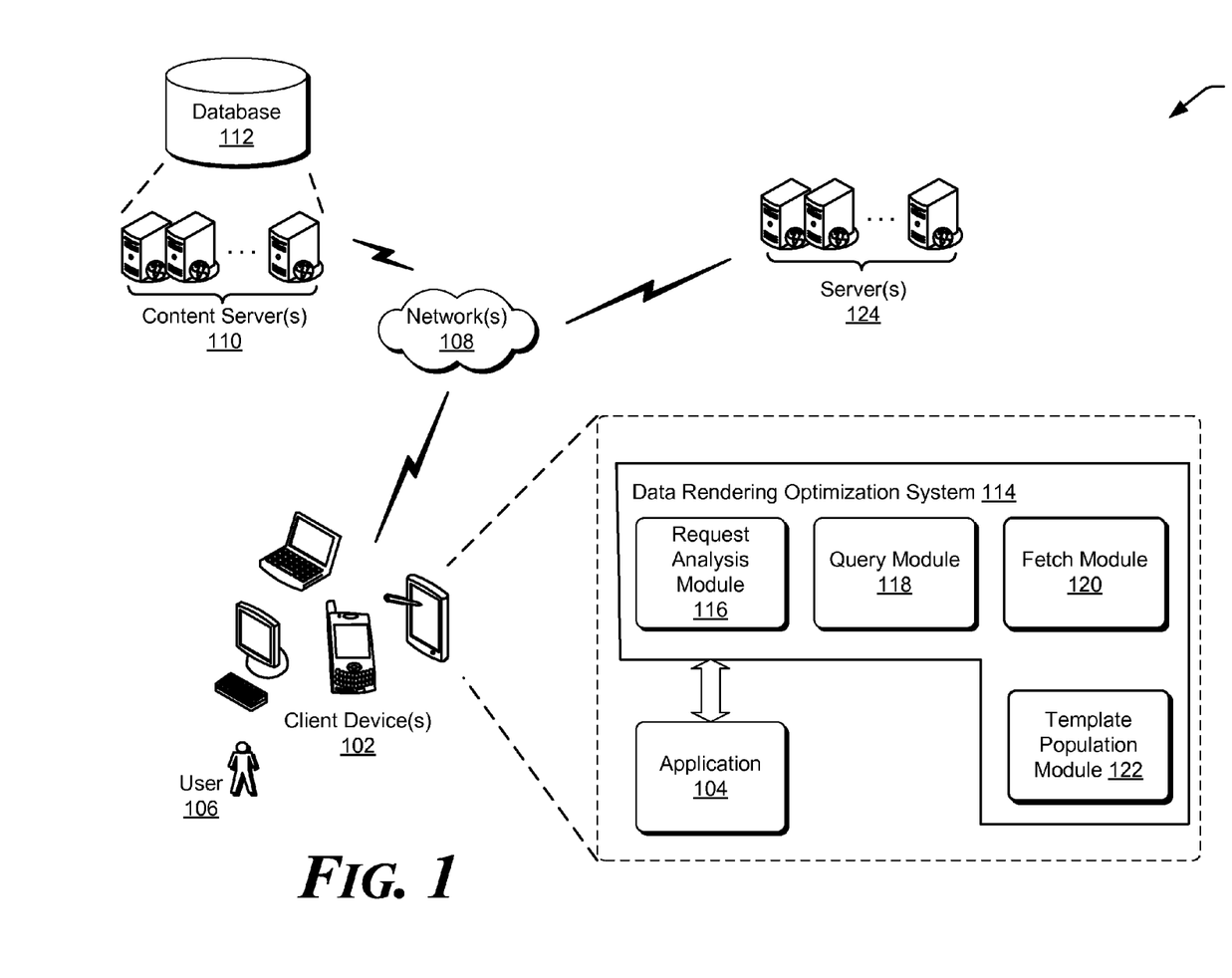
FIG. 1 is a schematic diagram of an illustrative computing environment for optimizing data rendering.

FIG. 1 illustrates a computing environment 100 for optimizing data rendering, in accordance with various embodiments. The computing environment 100 may include one or more client device(s) 102. The client devices 102 may include any sort of computing devices such as personal computers, laptop computers, mobile phones, set-top boxes, game consoles, personal digital assistants (PDAs), portable media players (PMPs) (e.g., portable video players (PVPs) and digital audio players (DAPs)), tablet computers, pad devices, netbooks, and other types of computing devices.

The client device 102 may include an application 104 to issue data requests. For example, if a user 106 of the client device 102 desires to browse for a new book using the Internet, she may use a web browsing application such as Windows® Internet Explorer to issue the data requests to an online web site (e.g., using a Uniform Resource Locator (URL)) over a network 108. In some instances, the data requests may specify one or more content server(s) 110 as being a target of the data request. For example, if the user desires to browse for books at the bookstore Borders®, the data request may specify the content server 110 as being www.borders.com.

The content server 110 may be any computing device that is in communication with the client device 102 and includes one or more database(s) 112 of objects (e.g., products, content, or other physical or electronic items). For instance, the content server 110 may be a SharePoint site, an e-commerce web site (e.g., www.amazon.com or www.borders.com), or any file storage location. In some instances, the content server 110 is communicatively coupled to the client device 102 via the network 108. The one or more networks 108 may include at least one of wide-area networks (WANs), local area networks (LANs), and/or other network architectures.

The computing environment 100 may further include a data rendering optimization system 114 to service the data requests issued by the application 104. The data rendering optimization system 114 may include a request analysis module 116, a query module 118, a fetch module 120, and a template population module 122 to perform optimized data rendering by progressively populating a template with requested data. While the template population module 122 is populating the template with the requested data, the data rendering optimization system 114 may communicate the populated templates to the application 104 for rendering at the client device 102. Unlike previous data rendering techniques which use techniques created by developers during design time to render requested data to the client device, the data rendering optimization system 114 fetches and/or renders the requested data in accordance with a prioritization of the requested data. In this manner, the same application may use a first sequence of fetch calls to fulfill a data request from a client device based on a first set of context factors and at the same time use a second sequence of fetch calls to fulfill the same data request from a different client device based on a second set of context factors. As a result, the first client device and the second client device will render the requested data in unique ways without a developer having to hard code these differences into the application during design time.

In order to optimize the data rendering, the request analysis module 116 may analyze the data request to determine what type of data being requested. For example, if the data request is a request to browse books, the data request may include books (i.e., objects of the database 112 referenced by a general identifier such as International Standard Book Numbers (ISBN)) as well as properties (e.g., title, author, price, rating, book cover image, etc.) that the user desires to view. Thus, if the data request is a request to view only title, author, and book cover image information for all books that are currently listed on the New York Times Best Seller Booklist, then the data request may include a list of ISBN numbers for each book that is currently on the New York Times Best Seller Booklist as well as title, author, and book cover image properties.

Once the request analysis module 116 determines what data is being requested, the query module 118 may formulate a set of queries operable to populate the template with the requested data. In some instances, the set of queries are prioritized based on one or more context factors such as capabilities of the requesting device (e.g., wattage, display resolution, display size (e.g., pixel size), memory, central processing unit (CPU) capabilities, battery life, etc.), network factors (e.g., network connection, network resources, network congestion, etc.), and user context (e.g., time of day/month/year, season, upcoming holidays, location of requesting device, zoom commands, properties indicated as having higher priority by the user, etc.). For example, if the requesting device is a mobile device which may have limited display resolution and limited CPU capabilities, then text based data may be given a higher priority than image data. As another example, if the requesting device has a low network connection such as a connection of a phone line, then data having a smaller size may be given priority. As a further example, if the user indicates a desire to view the data sorted by a category such as price, then the data rendering optimization system may give a higher priority to the price data.

The fetch module 120 may then fetch the requested data from the content server 110. Then, while the fetch module 120 is fetching the requested data, the template population module 122 may progressively populate a template with the fetched data. For example, if the properties having a text type (e.g., title and author) are first priority, the fetch module 120 may issue a first fetch call to the content server 110 requesting only title and author data for the requested books. Then, while the template population module 122 populates the template with the fetched data, the fetch module 120 may issue a second fetch call to the content server 110 requesting more properties for the books. Accordingly, the template population module 122 progressively populates the template with the requested data as it is being returned. Furthermore, while the template population module 122 progressively populates the template, the data rendering optimization system 114 may continuously communicate the progressively populated template to the application 104 for rendering at the client device.

The populated template may be rendered to a user interface at the client device. In some instances, the user interface resizes to accommodate the data that is progressively populating the template. In other instances, however, a size of the user interface is predetermined such that more data is added to the user interface as the requested data is progressively populating the template without resizing the user interface.

Thus, rather than rendering all of the requested data at the same time, the data rendering optimization system 114 may initiate the rendering as soon as the first fetch call is executed and then cause the template to be progressively rendered as more fetch calls are executed by the fetch module 120. Since the optimization (i.e., the progressive population of the template) is performed by the data rendering optimization system 114, the optimization techniques discussed herein may be applied to any application without having to communicate the context factors such as the capabilities of the client device to the content server 110. In other words, while previous data rendering techniques may require the application to execute different queries to the content server based on the capabilities of the client device, the data rendering optimization system 114 may be applied to all client devices without impacting the user's experiences.

In some instances, the data rendering optimization system 114 may reside on the client device 102. In other implementations, however, the data rendering optimization system 114 or any portion thereof may reside at one or more server(s) 124 that are external to the client device 102 and/or the content server 110. For example, a portion of the data rendering optimization system 114 may reside at the server 124 such that the data rendering optimization system receives the data request, analyzes the data request, formulates the queries, fetches the requested data, and progressively populates the template at the server 124. Then, the data rendering optimization system 114 may send the progressively updating template to the client device 102 for rendering.

In the event that the data rendering optimization techniques discussed herein are applied to render data from web sites such as www.borders.com, the operations of the data rendering optimization system 114 may be performed at the client device without making any changes to the existing web site (e.g., www.borders.com).

Figure 2:
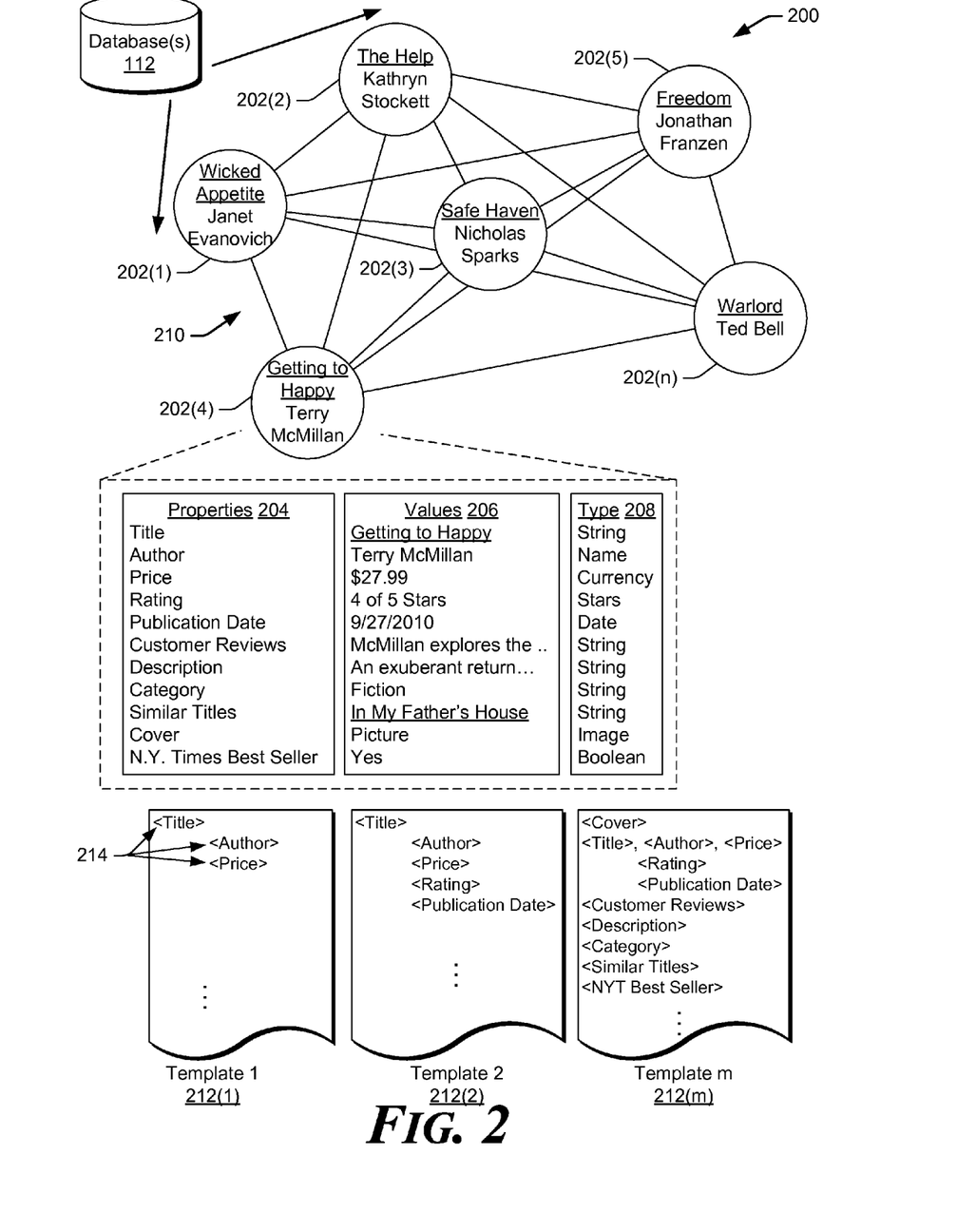
FIG. 2 is a schematic diagram of an illustrative environment that may be used as a basis to construct templates.

FIG. 2 illustrates an example environment 200 that may be used as a foundation to construct templates. The example environment 200 is illustrated with respect to the database 112 that is stored to the content server 110. In the example environment 200, the database 112 is depicted as an exemplary bookstore database. The database 112 includes one or more objects 202(1) . . . (*n*) (collectively "202") such as database values, consumer products, images, etc. For instance, the objects 202 may be books of the bookstore database (e.g., object 202(4) may be the book "Getting to Happy" authored by Terry McMillan).

Each object 202 in the database 112 may have one or more properties 204 (e.g., title, author, price, rating, publication date, customer reviews, description, category, similar titles, cover, New York Times Best Seller list, etc.). In some instances, the properties 204 of the objects 202 may vary from object to object within the database 112. For example, if the database 112 is a general product catalog such as Amazon®, the database may include electronics, books, home goods, etc. In such instances, the book objects may have properties which include author, while electronic objects (e.g., televisions) may not have such properties. In some instances, one or more of the properties 204 may be common to all objects 202 in the database 112 (e.g., title, price, and rating). As further depicted in the example environment 200, the properties 204 of the objects 202 may have corresponding values 206 and types 208. For example, a title property of the object 202(4) may have the value "Getting to Happy" which is of the type "string."

In some instances, the objects 202 may be grouped into one or more cluster(s) 210 (e.g., "fiction," "non-fiction," "children's," "New York Times Best Sellers," "Sports," etc.) based on the values of the objects. The clusters 210 may be hard coded, or algorithmically computed based on hard values (e.g., title/price) or softer values (e.g. rating). In the example environment 200, the objects 202(1) . . . (*n*) are depicted as belonging to the cluster New York Times Best Seller list.

One or more templates 212(1) . . . (*m*) (collectively "212") may be developed based on a structure of the database. The templates 212 may be renderable forms that include one or more property tags 214 that correspond to one or more of the properties of the objects in the database. Each template 212 may have a different number of property tags. For instance, template 1, 212(1), is an exemplary template having property tags corresponding to title, author, and price properties. Template 2, 212(2), is an exemplary template having property tags corresponding to title, author, price, rating, and publication date properties. Template m, **212(*m*), is an exemplary template having property tags corresponding to title, author, price, rating, publication date, customer reviews, description, category, similar titles, and New York Time Best Seller properties. Accordingly, when the template 2, 212(2)**, is rendered it displays values corresponding to each of the property tags included in the template 2.

In some instances, the templates 212 are created at design time by a developer. In addition, the templates 212 may specify a layout of the data (i.e., specify where the requested data is located within the template). A developer of the templates 212 may select which properties are to be included in the templates 212 based on various situations in which the developer envisions the objects and corresponding properties of the database 112 being rendered. For instance, the developer of the templates 212 may consider users viewing the objects of the database 112 from all types of client devices of varying data rendering capabilities. After selecting the properties to be included in the templates 212, the templates are created with the property tags for one or more properties. In other words, during creation (i.e., design phase) the templates 212 do not include the values 206 of the objects but rather include the property tags which can be used to fetch the values from the content server 110 when the templates are later executed.

As depicted in the example environment 200, each of the templates may include varying properties. For instance, template 212(1), may include basic properties 204 of the objects 202 while, another template, such as template 212 (*m*), may include more properties 204 of the objects 202. In some instances, the templates 212 may be tailored for use based on context factors such as capabilities of the client device (e.g., wattage, display resolution, display size (e.g., pixel size), memory, central processing unit (CPU) capabilities, battery life, etc.). For example, template 212(1) may be tailored for use on client devices 102 having limited resolution capabilities while template **212(*m*) may be tailored for use on a client device 102 that has more advanced display resolution capabilities. In other instances, the templates 212 may be tailored for use based on other context factors such as user context (e.g., time of day/month/year, season, upcoming holidays, location of requesting device, zoom commands, properties indicated as having higher priority by the user, etc.). For example, template 212(1) may be tailored for use in response to receiving an indication from the user to view less detailed data (e.g., the user issues a zoom-out command) while template 212(*m*)** may be tailored for use in response to receiving an indication from the user to view more detailed data (e.g., the user issues a zoom-in command).

Although the example environment 200 depicts three templates, any number of templates may be created for each database 112. In addition, the templates may be updated after an initial launch of the database 112 such as to accommodate changes made to the database after it is launched, to respond to user feedback, and/or to adapt to later developed device types/features.

Illustrative Processes

Figure 3:
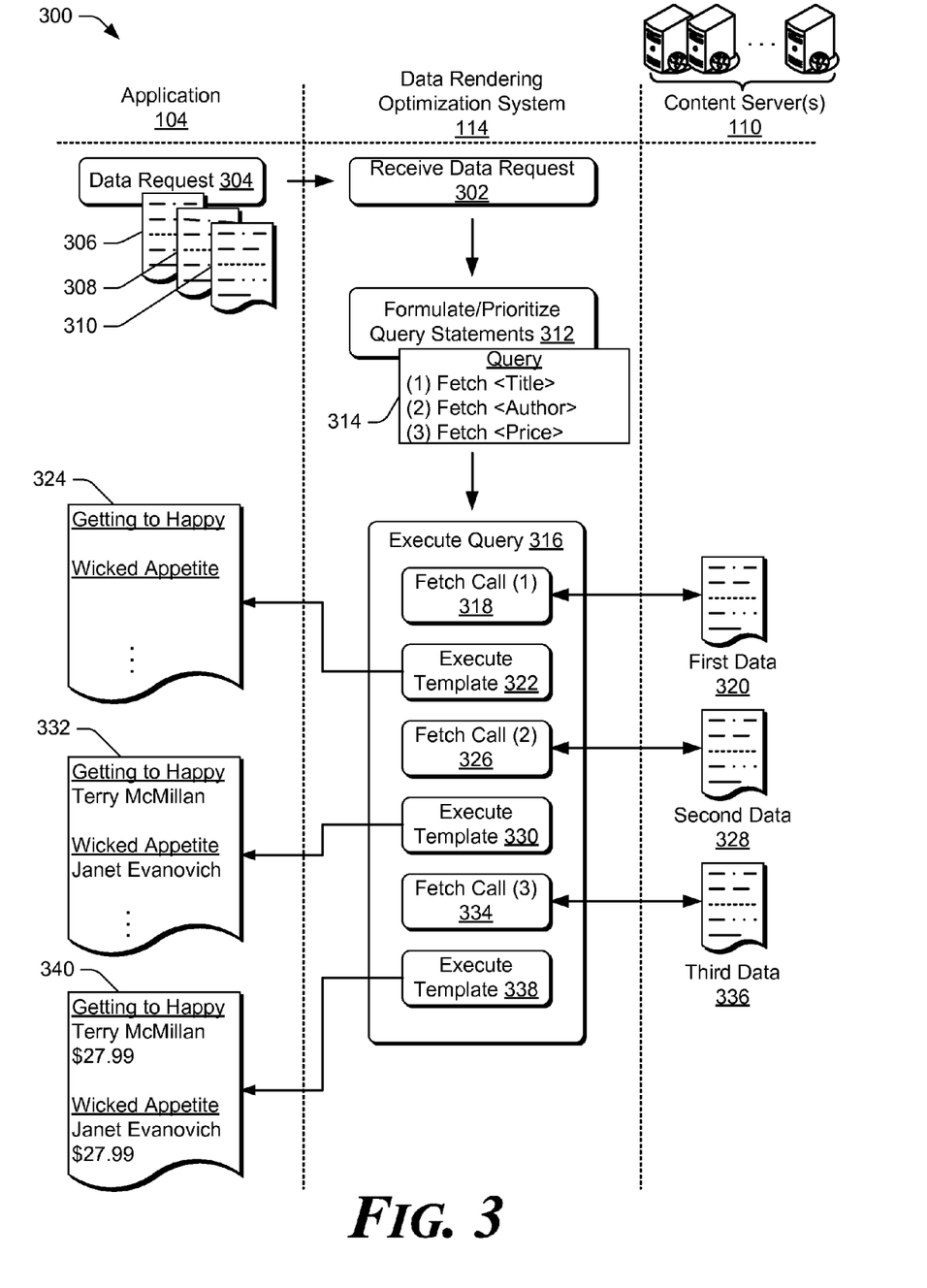
FIG. 3 is a pictorial flow diagram of an illustrative process to populate lower complexity templates.
Figure 4:
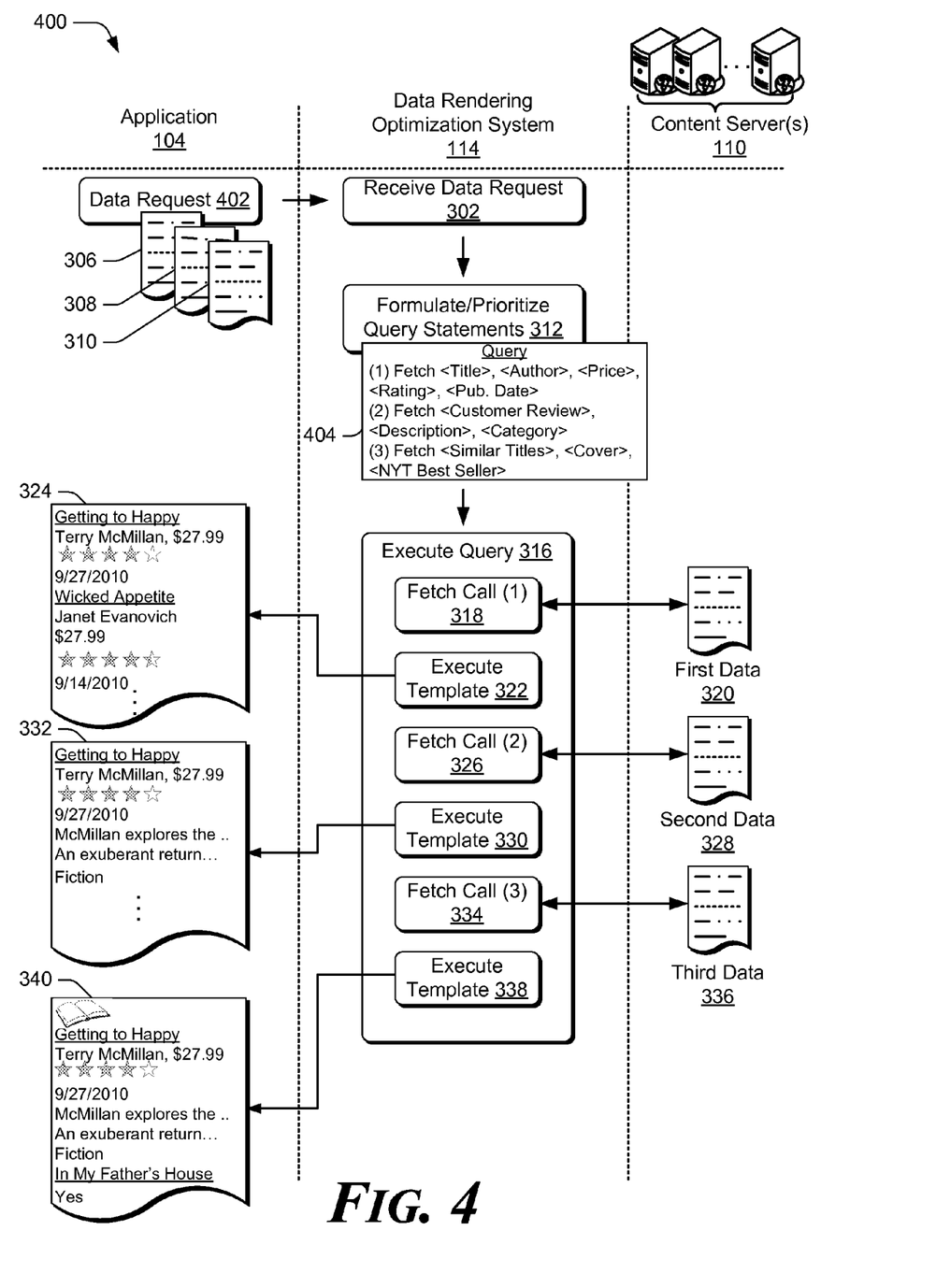
FIG. 4 is a pictorial flow diagram of an illustrative process to populate higher complexity templates.

FIGS. 3-4 are pictorial flow diagrams describing various illustrative processes for implementing data record extraction techniques. FIGS. 3-4 are illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and other types of executable instructions that perform particular functions or implement particular abstract data types. The order in which the operations are described is not intended to be construed as a limitation, and any number of the described blocks can be combined in any order and/or in parallel to implement the process. Other processes described throughout this disclosure, such as process 500 of FIG. 5 and process 700 of FIG. 7, shall be interpreted accordingly.

FIG. 3 is a pictorial flow diagram showing an illustrative process 300 for implementing data record extraction techniques based on a basic template such as the template 1, 212(1). For instance, the illustrative process 300 may be used in situations where the client device requesting the data has a lower display resolution or when the user desires to view only a limited amount of data.

At 302, the data rendering optimization system 114 receives a data request 304 from the application 104. The data request 304 may be a request to view one or more objects of the database 112 that are stored at the content server 110. The data request 304 may include a template 306 and an object identifier 308. In some instances, the data request 304 further includes one or more of the context factors 310. The context factors 310 may include capabilities of the client device, network factors, and user context, such as described above. The object identifier 308 may be a list identifying which objects are being requested. The template 306 may be a renderable user interface including one or more property tags identifying what data is being request. For example, if the data request 304 is a request to view title, author, and price information for one or more books from an on-line bookstore, then the object identifier 308 may be a list of ISBN numbers for each of the one or more books requested, and the template 306 may be a renderable user interface including property tags for a combination of title, author, and price data. Although the illustrative process 300 depicts the template 306 as being the template 1, 212(1), such depiction is for illustrative purposes only and should not be construed as a limitation. Rather, the template 306 may be any template developed based on a structure of the database 112.

In some instances, the application 104 determines the template 306 to include in the data request 304 based on one or more of the context factors 310 such as the capabilities of the client device. In addition to the template 306 identifying what data are requested, in some instances, the template also identifies a priority of the requested data. In such instances, the application 104 determines the template 306 to include in the data request 304 as well as the priority of the requested data based on one or more of the context factors 310.

At 312, the data rendering optimization system 114 may formulate one or more query statements 314. In some instances, the query statements 314 are a series of fetch calls to the content server 110 operable to populate the template 306 with values corresponding to the property tags of the template. Each query of the query statements 314 may be a fetch call for a single value (e.g., fetch title only) or it may be a fetch call for multiple values (e.g., fetch title and author).

In some instances, the data rendering optimization system 114 may optionally prioritize the query statements 314 at 312 based on one or more of the context factors 310. For example, if the template 306 itself fails to prioritize the requested data, then the query module 118 may prioritize the query statements 314 at 312. In other instances, the data rendering optimization system 114 may further prioritize the query statements 314 at 312 in addition to any prioritization performed by the application 106. For instance, the application 106 may first prioritize the requested data based on the context factors that pertain to the capabilities of the client device and/or the user context. The query module 118 may then further prioritize the requested data at 314 based on additional context factors such as the context factors that pertain to the network factors and/or the user context. In this way, the data rendering optimization system 114 may optionally prioritize the query statements 314 at 312 while remaining agnostics as to the capabilities of the client device.

In some instances, the application 106 or the query module 118 may prioritize the query statements based on the context factors after design time as opposed to hard coding the query statements into a back end language between the application 104 and the content server 110 at design time.

At 316, the data rendering optimization system 114 executes the query statements 314. In some instances, the data rendering optimization system 114 progressively executes the query statements 314 such that the template 306 is progressively populated with values and rendered for display. Previous data rendering techniques which are agnostic to the capabilities of the client device 102 consequently rely on techniques created by developers during design time to determine what data to request. The techniques of the data rendering optimization system 114, in contrast, fetches and/or renders the requested data in accordance with a prioritization of the requested data. That is, the specific data fetched and rendered, and/or the order in which it is fetched and rendered may vary depending on, among other things, context factors such as capabilities of the requesting device, network factors, and user context.

The data rendering optimization system 114 may progressively execute the query statements 314 by making a series of fetch calls to the content server 110. For example, if the query statements 314 contain three fetch statements (e.g., a fetch title statement, a fetch author statement, and a fetch price statement), then the data rendering optimization system 114 may make three separate calls to the content server 110. The data rendering optimization system 114 may make a first fetch call 318 (i.e., fetch title call) to the content server 110. In response to the first fetch call 318, the data rendering optimization system 114 may receive a first data 320 (i.e., title values of the database 112 corresponding to title properties) from the content server 110. In some instances, the data rendering optimization system 114 makes a batch call to the content server for at least a portion of the objects that are listed in the object identifier 308 for each of the query statements 314. For example, if the object identifier 308 lists ISBN values for the books "Getting to Happy," "Wicked Appetite," and "The Girl Who Kicked the Hornet's Nest," then the first fetch call 318 (i.e., fetch title call) may include a batch call for first data for multiple books. When making a batch call, the data rendering optimization system 114 may use information in the object identifier 308 such as client device display size (e.g., pixel size) to determine how many objects should be included in a batch call. For example, if the display size of the client device is such that only two titles may be displayed at a time, the data rendering optimization system 114 may only fetch two titles from the content server 110. If, after the template is rendered, the user desires to view the rest of the titles, the application 104 and/or the data rendering optimization system may fetch more of the titles in response to user input commands such as scroll down. In other instances, the data rendering optimization system 114 may make individual fetch title calls to the content server 110 for each of the objects listed in the object identifier 308. In still other instances, the data rendering optimization system 114 may prefetch somewhere between a minimal number of viewable objects and a total number of requested objects to strike a balance between performance and anticipation that users will scroll through the objects.

After making the first fetch call 318 (i.e., fetch title call), the data rendering optimization system 114 may make a first execute statement call 322 to populate the template 306 with at least a portion of the first data 320 and communicate the populated templates to the application 104 for rendering at the client device 102. Accordingly, a first display 324 displaying only the first data 320 (i.e., the data fetched in the first fetch call 318) may be rendered at the client device.

While the data rendering optimization system 114 is making the first execute statement call 322, the data rendering optimization system may simultaneously begin to further populate the template by making a second fetch call 326 (e.g., fetch author call) to the content server 110. Similar to the first fetch call 318, the second fetch call 326 may be a batch call for second data 328 (e.g., author values) for at least a portion of the objects listed in the object identifier 308. After making the second fetch call 326 (i.e., fetch author call), the data rendering optimization system 114 may make a second execute statement call 330 to further populate the template 306 with at least a portion of the second data 328 received in response to the second fetch call 326 and communicate the updated populated templates to the application 104 for rendering at the client device 102. Accordingly, a display at the client device is updated to display a second display 332 which displays both title and author data (i.e., the data fetched in the first fetch call 318 and the second fetch call 326).

The display may be updating using various methods such as by refresh, or by inserting data to existing results without refreshing the view. For instance, the second execute statement call 330 may insert the author data into the second display 332 which is already rendered and already contains the title data such that the data rendering optimization system 114 does not have to re-fetch the title data when generating the second display. In such instances, the optimized data rendering techniques only fetch and/or render data once regardless of whether such data is included in more than one of the displays.

In some instances, the second display 332 and the first display 324 are of different sizes such that the display itself is resized to accommodate the newly fetched data (e.g., author values). In other instances, however, the first display 324 and the second display 332 may be a same size such that the newly added data (e.g., author values) is added to the second display 332 without resizing a size of the display.

While the data rendering optimization system 114 is making the second execute statement call 330, the data rendering optimization system may simultaneously begin to further populate the template by making a third fetch call 334 (e.g., fetch price call) to the content server 110. Similar to the second fetch call 326, the third fetch call 334 may be a batch call for third data 336 (e.g., price values) for at least a portion of the objects listed in the object identifier 308. After making the third fetch call 334 (i.e., fetch price call), the data rendering optimization system 114 may make a third execute statement call 338 to further populate the template 306 with at least a portion of the third data 336 (i.e., the price values) received in response to the third fetch call 334 and communicate the updated populated templates to the application 104 for rendering at the client device 102. Accordingly, a display at the client device is further updated to display a third display 340 which displays title, author, and price data (i.e., the data fetched in the first fetch call 318, the second fetch call 326, and the third fetch call 334).

In some instances, the third display 340 and the first display 324 are of different sizes such that the display itself is progressively resized to accommodate the newly fetched data (e.g., author values and price values). In other instances, however, the third display 340 and the first display 324 may be a same size such that the progressively added data (e.g., author values and price values) is added without having to resize the display.

As illustrated in FIG. 3, rather than using techniques created by developers during design time to render requested data, the data rendering optimization system 114 optimizes data rendering by fetching and/or rendering the requested data in accordance with a prioritization of the requested data. That is, the specific data fetched and rendered, and/or the order in which it is fetched and rendered may vary depending on, among other things, context factors such as capabilities of the requesting device, network factors, and user context. As noted above, the progressive rendering may be performed by iteratively refreshing the display and/or by seamlessly inserting data into the display as it is progressively rendered.

FIG. 4 is a pictorial flow diagram showing an illustrative process 400 for implementing data record extraction techniques based on the template m, 212(*m*). For instance, the illustrative process 400 may be used in situations where the client device 102 requesting the data has a higher display resolution or when the user 106 desires to view a large amount of data for various objects.

At 302, the data rendering optimization system 114 receives a data request 402 from the application 104. The data request 402 may be a data request to view detailed data such as title, author, price, rating, publication date, customer reviews, description, category, similar titles, cover image, and whether the object is on the New York times best seller list for a list of books such as the New York Times Bestseller list. Accordingly, the data request may include the template 306 identifying the requested data (e.g., title, author, price, rating, publication date, customer reviews, description, category, similar titles, cover image, and whether the object is on the New York times best seller list) and optionally a priority of the requested data and the object identifier 308 identifying the requested books (e.g., ISBN values for the books on the New York Times Bestseller list). In some instances, the data request 402 also includes the context factors 310.

At 312, the data rendering optimization system 114 formulates and optionally prioritizes one or more query statements 404. Each of the query statements 404 may include one or more values. For instance, the first query statement may be a fetch call for title, author, price, rating, and publication date. The second query statement may be a fetch call for customer reviews, description, and category information. The third query statement may be a fetch call for similar titles, cover image, and whether the object is on the New York Times best seller list.

Similar to the illustrative process 300, the data rendering optimization system 114 may execute each of the query statements in series such as to progressively populate the template 306 with the requested data. Accordingly, the first display 324 may display title, author, price, rating, and publication date values. The second display 332 may add customer reviews, description, and category values to the display. The third display 340 may finally add a similar titles list, a cover image, and whether the object is on the New York Times best seller list to the display.

In some instances, rather than fetching all of data in the query statements, the fetch calls may fetch only a portion of the data in the query statements. For example, the second fetch call 326 includes a call to fetch customer review data. Assuming that there are five customer reviews for an object, the second fetch call 326 may fetch only the total number of comments from the content server 110 and then populate the template with the text "comments (5)" rather than populating the template with all five comments. In such instances, the application 104 and/or the data rendering optimization system may fetch and/or populate more of the titles in response to user input commands such as zoom-in, scroll, selection of an expansion icon, etc.

In the event that the fetch call includes a call to fetch a value having an image or video type, the data rendering optimization system 114 may progressively fetch such data. For example, the third fetch call 334 may include a call to fetch cover image data (i.e., an image). Based on the context factors such as capabilities of the client device, the data rendering optimization system 114 may first fetch the image as a low resolution thumbnail. Then as the low resolution thumbnail is being rendered at the client device, the data rendering optimization system 114 may then fetch the image as a higher resolution image. Thus, rather than having to wait for the application to display an image, the user may be able to progressively see the image being rendered at the display.

Similar to FIG. 3, a size of the first display 324, the second display 332, and the third display 340 maybe the same or different. For example, in some instances, the third display 340 and the first display 324 are of different sizes such that the display itself is progressively resized to accommodate the newly fetched data (e.g., customer review, description, category, similar titles, cover image, and New York Times bestseller list values). In other instances, however, the third display 340 and the first display 324 may be a same size such that the progressively added data (e.g., customer review, description, category, similar titles, cover image, and New York Times bestseller list values) is added without having to resize the display.

Figure 5:
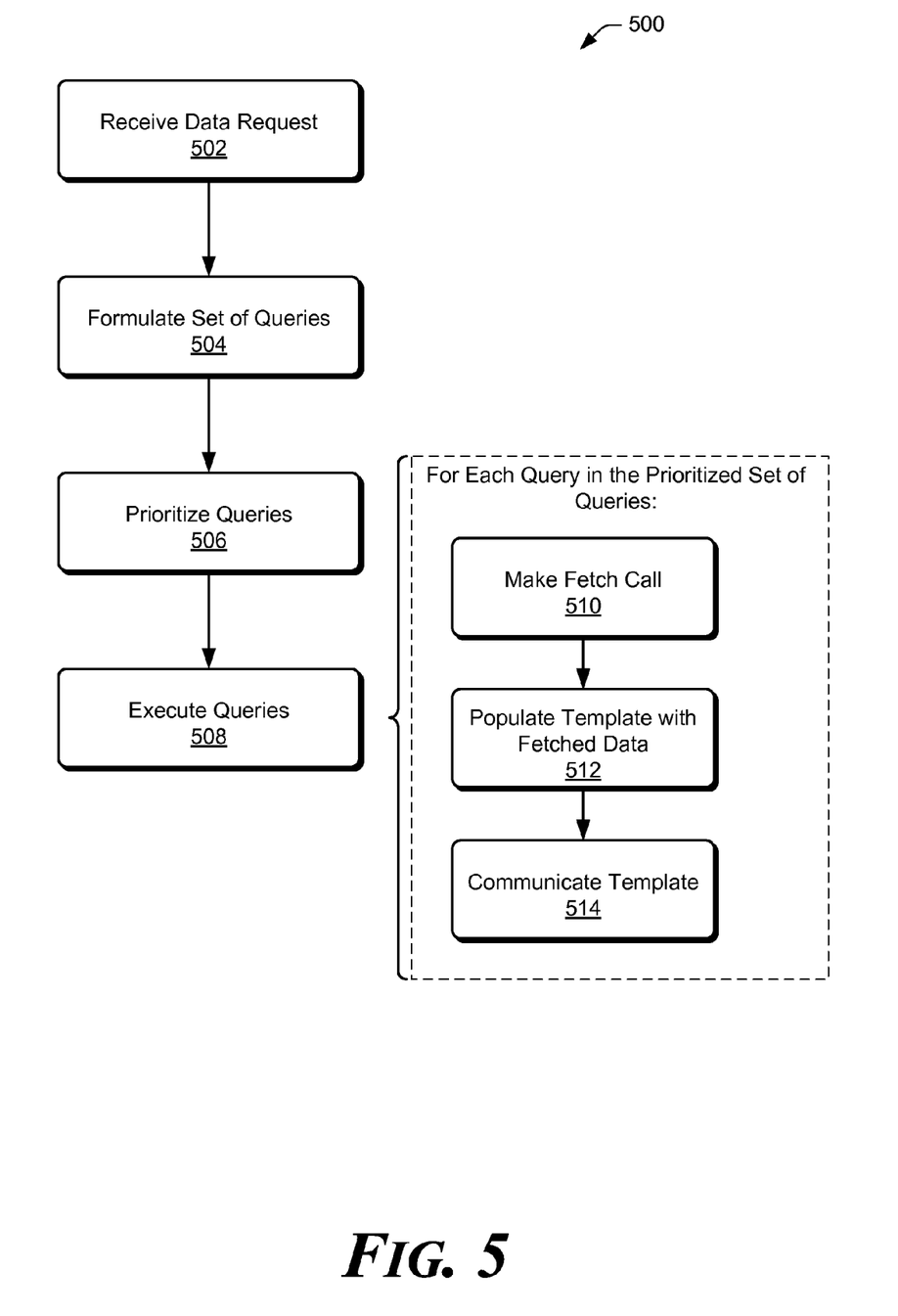
FIG. 5 is a flow diagram of an illustrative process of implementing data record extraction techniques.

FIG. 5 describes an illustrative process 500 to perform data rendering optimization in accordance with various embodiments. The process 500 may be implemented by the data rendering optimization system 114 which may be stored at the client device 102, the content server 110 or any combination thereof. In some instances, the process 500 is performed after design time during execution of a data request.

At 502, the request analysis module 116 receives a data request from the application 104. The data request may include the object identifier 308 identifying one or more objects of a database and the template 306 identifying one or more property tags for the objects and optionally a priority of the property tags. In some instances, the data request additionally includes one or more of the context factors 310. In some instances, the template 306 is created at design time. For example, the template 306 may be part of a collection of templates created at design time based on various situations in which the developer envisions the objects of the database 112 being rendered. In some instances, the template may be compiled into the application 104 at the client device during design time. In other instances, the template may be downloaded from the server 124 by the application after design time.

At 504, the query module 118 formulates a set of queries operable to populate the template with values corresponding to the one or more property tags identified in the template. In some instances, each query in the set of queries is a fetch call to the content server 110 to fetch values corresponding to one or more of the property tags identified in the template. For example, if the template includes title, author, and price property tags, then the query module 118 may formulate a first query to fetch title values, a second query to fetch author values, and a third query to fetch price values. By formulating the set of queries at 504, the query module 118, rather than a developer, determines which queries to execute in order to populate the template with the requested data.

At 506, the query module 118 optionally prioritizes the queries in the set of queries. In some instances, if the template 306 itself fails to prioritize the requested data, then the query module 118 may prioritize the queries at 506 based on one or more of the context factors such as capabilities of the requesting device, network factors, and user context. In other instances, the query module 118 may further prioritizes the requested data at 506 in addition to a prioritization that is dictated by the template 306 such as discussed above with respect to FIG. 3.

At 508, the fetch module 120 and the template population module 122 collectively execute the queries. In some instances, executing the queries at 508 includes executing each query in series such that the template is progressively populated with values corresponding to one or more of the properties identified in the template. For instance, for each query in the set of queries, the data rendering optimization system 114 makes a fetch call at 510, populates the template at 512, and communicates the template to the client device at 514. At 510, the fetch module 120 makes the fetch call to the content server 110 to fetch values for one or more of the properties dictated by that query. For example, if the query is a query to fetch title values, then the fetch module 120 fetches title values at 510. At 512, the template population module 122 populates the template with the values fetched at 510. Then at 514, the template population module 122 communicates the populated template to the application 104 for rendering at the client device 102.

Illustrative Implementation

Figure 6:
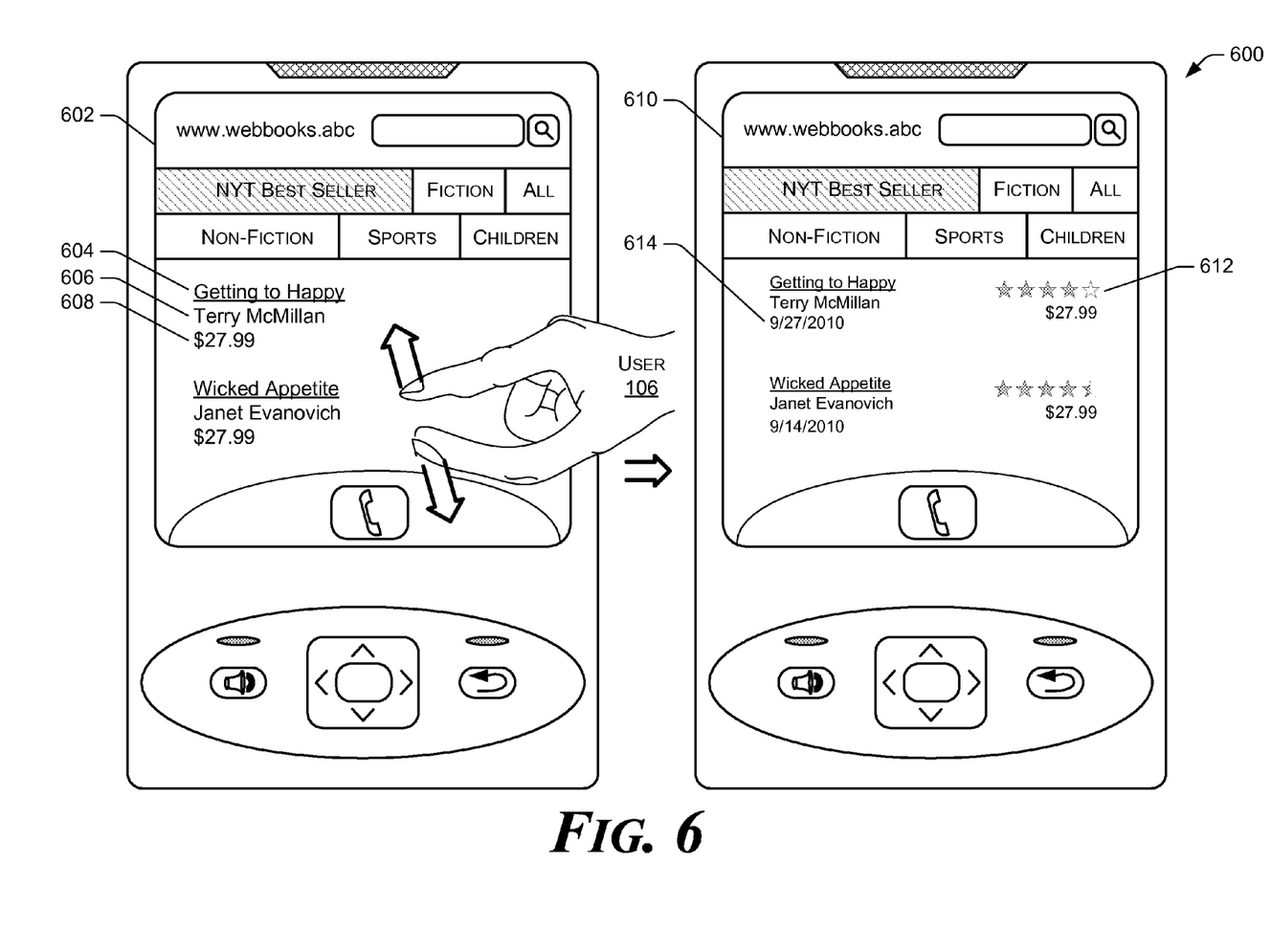
FIG. 6 is a schematic diagram of an illustrative client device depicting utilizing multiple templates to optimize data rendering.

FIG. 6 is an illustrative client device 600 depicting utilizing multiple templates to optimize data rendering. The illustrative client device 600 includes a first screen depicting a rendered template 602. For instance, the user 106 of the illustrative client device 600 may browse an online bookstore (i.e., www.webbooks.abc) to request books on the New York Times bestseller list from her mobile device.

The data request is then processed by the data rendering optimization system 114 using a process such as illustrative process 500 to yield the rendered template 602. For instance, if the rendered template 602 is the template 1, 212(1), which includes title, author, and price properties, the rendered template displays title value 604, author value 606, and price value 608 for one or more of the books on the New York Times bestseller list.

Now suppose the user 106 desires to view more information about the displayed books. Using the data rendering optimization techniques described herein, the user may communicate the desire to view more information by issuing a command such as a zoom-in, scroll, selection of an expansion icon, etc. For example, if the illustrative client device 600 has a touch screen, the user 106 may touch her thumb and forefinger to the screen and then move the thumb and forefinger apart to gesture a zoom-in event. In response, the application 104 may issue another data request to the data rendering optimization system 114 which includes a target template 610 that identifies which data to add to the rendered template 602. When processing this next data request, the data rendering optimization system 114 may use a process such as illustrative process 500 to yield the target template 610. For instance, if the target template 610 is the template 2, 212(2), which includes title, author, price, rating, and publication date properties, then, when rendered, the target template adds a rating value 612 and a publication date value 614 to the illustrative client device 600.

In previous data rendering techniques that make fetch calls to databases that offer a high volume of products, the data may be rendered as a series of click-through web pages. For instance, a first screen may display a limited number of objects (i.e., products) along with some high level data such as price, title, product rating, etc. If the user then desires to view more detailed information pertaining to that object, she could click on a link which would lead them to a second screen which may display more detailed product information such as customer comments, reviews, product specification, images of the product, relationships to other products, etc. Accordingly, in the previous data rendering techniques the user would have to navigate through multiple screens in order to view all the data pertaining to that object. Moreover, during such click-through techniques, redundant data (i.e., data common to multiple screens such as price and title data) may be fetched and/or rendered multiple times putting undue burden on the client device.

Using the data rendering optimization techniques discusses herein, however, the data rendering optimization system 114 may render requested data to a single display screen using a process such as illustrative process 500. The data rendering optimization system 114 may then progressively fetch more detailed information as illustrated by the illustrative client device 600 to display more detailed information to the screen without having to render additional screens. In other words, the multiple templates compiled into the application 104 may be used along with a user command (e.g., zooming-in, zooming-out, scrolling, selection of an expansion icon, etc.) input to add or remove data from a rendered display without having to click-through multiple displays. In addition, such optimized data rendering techniques only fetch and/or render data once regardless of whether such data is included in more than one of the templates. For instance, if the rendered template 602 is the template 1, 212(1), which includes title, author, and price properties, the rendered template displays title value 604, author value 606, and price value 608. Then, if the user issues a zoom-in command to view more detailed information about the books such as title, author, price, rating, and publication date properties, then the data rendering optimization system 114 may add the rating and publication data values to the display without re-fetching the title, author, and price values.

In some instances, the data rendering optimization system 114 may provide feedback to the user 106 in response to issuing the command (e.g., zoom, scroll, selection of an expansion icon, etc.) to view more or less information. For instance, if the user 106 the user 106 touches her thumb and forefinger to the screen and then moves her thumb and forefinger apart (e.g., zoom-in), the data rendering optimization system 114 may first respond by displaying illustrative property tags (e.g., <RATING> and <PUBLICATION DATE>) of the target template without fetching or displaying the actual values for these property tag. The data rendering optimization system 114 may then wait until the user 106 finishes issuing the command (e.g., removes her thumb and forefinger from the screen) before processing the data request to add data to the rendered template 602. In this way, the user is able to know exactly when to stop issuing the command (e.g., how far apart the user needs to move her thumb and forefinger before removing her thumb and forefinger from the screen) in order to view the exact amount of desired information. In turn, the data rendering optimization system 114 optimizes data rendering by waiting until the user issues the command that they desire before processing the command. In other words, the data rendering optimization system 114 is able to provide feedback to the user without having to generate or issue fetch calls to the content server 110.

In some instances, the rendered template 602 and the target template 610 are of different sizes such that the display itself is resized to accommodate the newly fetched data (e.g., rating and publication values). In other instances, however, the rendered template 602 and the target template 610 may be a same size such that the progressively added data (e.g., rating and publication values) is added without having to resize the display.

Figure 7:
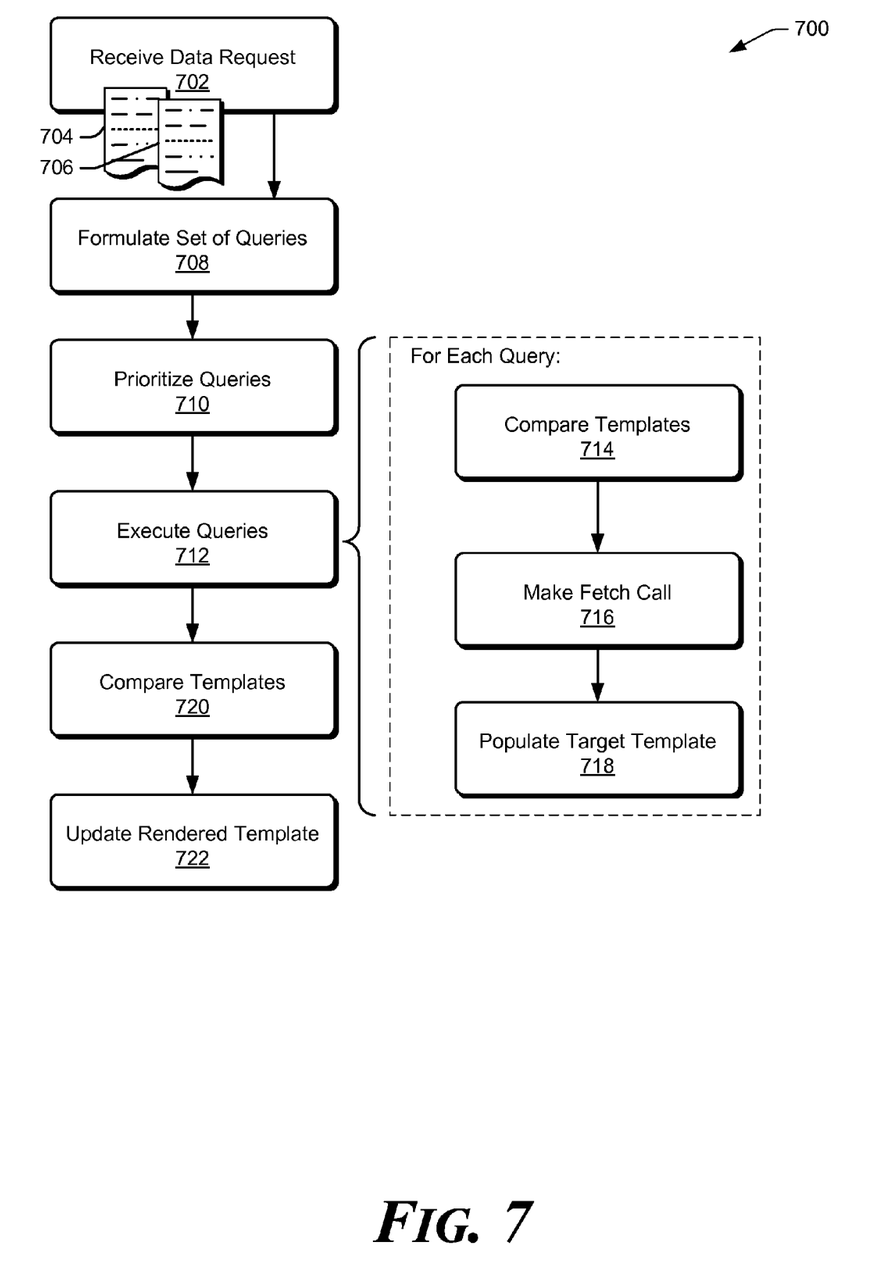
FIG. 7 is a flow diagram of an illustrative process of utilizing multiple templates to optimize data rendering.

FIG. 7 is a flow diagram that illustrates an illustrative process 700 of utilizing multiple templates to optimize data rendering. The illustrative process 700 may, but need not, be implemented by the data rendering optimization system 114.

At 702, the request analysis module 116 receives a data request from the application 104. In some instances, the data request may be a request issued by the user indicating a desire to view more or less detailed data (e.g., zoom-in, zoom-out, scroll, selection of an expansion icon, etc.). The data request may include the object identifier 308 identifying one or more objects of a database, a rendered template 704 identifying one or more properties 204 of the objects 202 that are currently rendered at the client device and a target template 706 such as the target template 610 identifying one or more properties 204 of the objects 202 that are to be rendered at the client device to fulfill the data request. In some instances, the data request further includes one or more context factors 310. In some instances, the rendered template 704 and the target template 706 are created at design time based on various situations in which the developer envisions the objects of the database 112 being rendered. In some instances, the target template 706 specifies a priority of the requested data.

At 708, the query module 118 formulates a set of queries operable to populate the target template 706 with values corresponding to the one or more property tags identified in the target template. In some instances, each query in the set of queries is a fetch call to the content server to fetch values corresponding to one or more of the properties identified in the template.

At 710, the query module 118 optionally prioritizes the queries in the set of queries based on, among other things, one or more of the context factors 310.

At 712, the fetch module 120 and the template population module 122 collectively execute the queries. In some instances, executing the queries at 712 includes executing each query in series such that the data rendering optimization system 114 progressively populates the target template 706 with values corresponding to one or more of the property tags identified in the target template. For instance, for each query in the set of queries, the data rendering optimization system 114 may perform operations of blocks 714-718.

At 714, the data rendering optimization system 114 compares the rendered template 704 with the target template 706 to determine whether the property tags of the target template 706 have already been fetched at 714. If the data rendering optimization system 114 determines that one or more of the property tags of the target template 706 have not been fetched, the fetch module makes a fetch call to the content server 110 at 716 to fetch values for property tags that are unique to the target template. In some instances the fetch module 120 only fetches values for objects that have not already been fetched. For instance, if the rendered template 704 includes values for title, author, and price properties 204 and the query being processed at 716 is a fetch call to fetch title, author, price, and rating properties 204, then the fetch module 120 may only fetch rating values at 716 since the values for the title, author, and price properties 204 have already been fetched. Accordingly, at 716, the data rendering optimization system 114 optimizes data rendering at 716 by not making redundant fetch calls to the content server.

At 718, the template population module 122 populates the target template 706 with the values fetched at 716 and communicates the target template to the application 104 for rendering at the client device 102.

Figure 8:
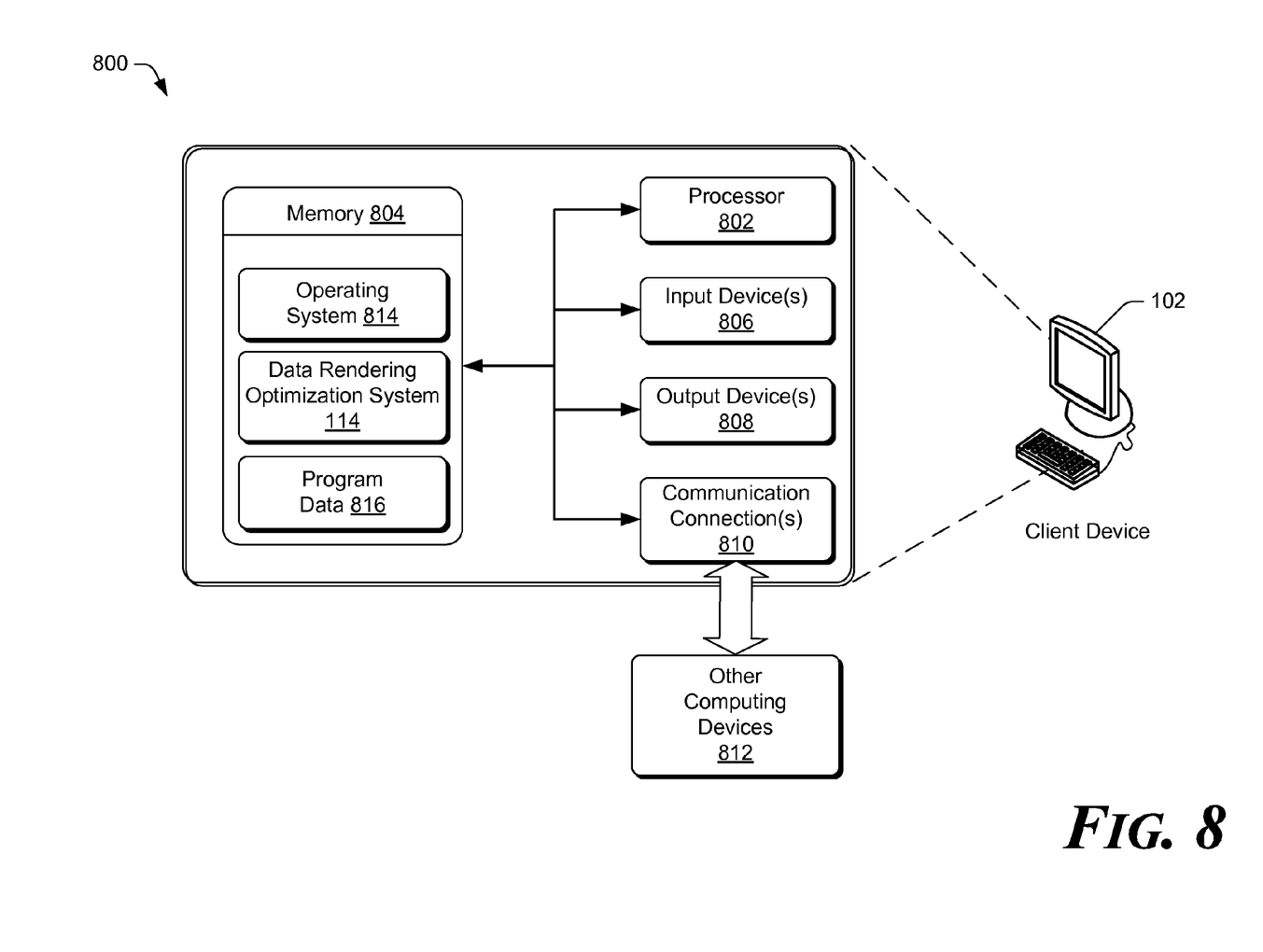
FIG. 8 is a block diagram of an illustrative computing device to implement data record extraction techniques.

At 720, the data rendering optimization system 114 compares the property tags of the rendered template 704 with the property tags of the target template 706 to determine, for each property tag in the rendered template 704, whether such property tag is also included in the target template 706. At 720, the data rendering optimization system 114 removes values from the rendered template corresponding to the property tags of the rendered template that are not included in the target template. For instance, if the data request received at 702 is a zoom-out request, then the rendered template 704 (i.e., displaying more information) may include property tags that are not present in the target template 706 (i.e., displaying less information). If the data rendering optimization system 114 determines that the rendered template 704 includes property tags that are not present in the target template 706, then the data rendering optimization system 114 updates the rendered template 704 at 722 by removing the property tags that are unique to the rendered template Illustrative Computing Device FIG. 8 illustrates a representative system 800 that may, but need not, be used to implement the data rendering optimization system 114. However, it will readily appreciate that the techniques and mechanisms may be implemented in other systems, computing devices, and environments. The data rendering optimization system 114 may be implemented as part of the client device 102 of FIG. 1. However, in other implementations, the data rendering optimization system 114 may be implemented as part of other computing devices such as the server 124. Moreover, the client device 102 shown in FIG. 8 is only one example of a computing device and is not intended to suggest any limitation as to the scope of use or functionality of the computer and network architectures. Neither should the client device 102 be interpreted as having any dependency nor requirement relating to any one or combination of components illustrated in the representative system 800.

The client device 102 may be operable to optimize data rendering. For instance, the client device 102 may be operable to receive data requests, formulate a set of queries based on the data requests, and execute the queries to optimize data rendering.

In at least one configuration, the client device 102 comprises one or more processors 802 and memory 804. The processors 802 may constitute micro processors or combinations of one or more specialized processing units or systems, such as those referred to as a "system on a chip." The client device 102 may also include one or more input devices 806 and one or more output devices 808. The input devices 806 may be a keyboard, mouse, pen, voice input device, touch input device, etc., and the output devices 808 may be a display, speakers, printer, etc. coupled communicatively to the processors 802 and the memory 804. The client device 102 may also contain communications connection(s) 810 that allow the client device 102 to communicate with other computing devices 812 such as via a network, and program data 816 to support the techniques of the data rendering optimization system 114.

The memory 804 of the client device 102 may store an operating system 814, the data rendering optimization system 114, and may include program data 816. The memory 804, or portions thereof, may be implemented using any form of computer-readable media that is accessible by the client device 102. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. The computer storage medium does not include modulated data signals, carrier waves, or other communication media.

CONCLUSION

In closing, although the various embodiments have been described in language specific to structural features and/or methodological acts, the subject matter defined in the appended representations is not necessarily limited to the specific features or acts described. Rather, the specific features and acts are disclosed as example forms of implementing the claimed subject matter.

What is claimed is:

1. A data rendering system, comprising:
   one or more one or more computer-readable storage devices;

one or more processors communicatively coupled to the one or more computer-readable storage devices;

a request analysis module stored in the one or more computer-readable storage devices and executable by the one or more processors to receive a data request from an application of a client device, the data request including an object identifier identifying an object of a database, a template identifying properties of the object, and a context factor;

a query module stored in the one or more computer-readable storage devices and executable by the one or more processors to formulate queries operable to populate the template with values corresponding to at least one of the properties identified in the template, the formulated queries executed according to a prioritization based at least in part on the context factor, wherein the values associated with the data request are fetched and rendered in an order that varies in response to different context factors such that:

values are fetched and rendered in a first order for a first data request from a first client device associated with a first context factor; and values are fetched and rendered in a second order, different than the first order, for a second data request from a second client device associated with a second context factor that is different than the first context factor, wherein the second data request and the first data request correspond to a same object of the database;

a fetch module to fetch the values from a content server for each query in the set of queries; and a template population module to populate the template with the values fetched from the content server for each query in the set of queries.

2. The system of claim 1, wherein the query module is further configured to:
further prioritize the formulated queries based at least in part on an additional context factor.

3. The system of claim 1, wherein the template dictates the prioritization of the formulated queries.

4. The system of claim 1, wherein the template population module is configured to progressively populate the template with the fetched values by populating a first portion of the template with a first portion of the fetched values, communicate at least the populated first portion of the template to the client device for rendering, populate a second portion of the template with a second portion of the fetched values, and communicate at least the populated second portion of the template to the client device for rendering.

5. The system of claim 1, wherein the system includes the application stored in the one or more computer-readable storage devices.

6. A method, comprising:
under control of one or more processors configured with executable instructions:
receiving a data request from an application of a client device, the data request including an object identifier identifying an object of a database and a template identifying properties for the object;
receiving a prioritization factor;
formulating a set of queries operable to populate the template with values corresponding to at least one of the properties identified in the template, the set of queries executed according to a prioritization based at least in part on the prioritization factor, such that:
a first sequence of queries is formulated for a first data request that is received from a first client device based at least in part on the first client device being associated with a first prioritization factor; and
a second sequence of queries, that is different than the first sequence of queries, is formulated for a second data request that is received from a second client device based at least in part on the second client device being associated with a second prioritization factor that is different than the first prioritization factor, wherein the first data request and the second data request correspond to a same object of the database;
executing the set of queries to progressively populate the template with the values; and
communicating the template to the client device.

7. The method of claim 6, wherein the executing the set of queries includes, for each query in the set of queries:
making a fetch call against a content server to fetch values for at least one of the properties identified in the template; and
populating the template with the values fetched.

8. The method of claim 6, wherein the template is part of a collection of templates created at design time or downloaded from a server by the application after design time.

9. The method of claim 6, wherein individual queries of the set of queries comprise a call to a content server.

10. The method of claim 6, wherein at least one query of the set of queries comprises a batch call to fetch values corresponding to at least one of the properties identified in the template for two or more objects identified in the object identifier.

11. The method of claim 6, further comprising:
receiving an update request from the application of the client device, the update request including a rendered template and a target template, the rendered template having a subset of properties listed in the target template;
comparing the rendered template with the target template to determine new properties as being properties that are unique to the target template;
fetching new values for at least one of the new properties;
populating the target template with the new values; and
communicating the target template to the client device.

12. The method of claim 6, further comprising:
receiving an update request from the application of the client device, the update request including a rendered template and a target template, the target template having a subset of properties listed in the rendered template;
comparing the rendered template with the target template to determine excess properties as being properties that are unique to the rendered template;
removing at least one of the excess properties from the rendered template; and
communicating the rendered template to the client device.

13. The method of claim 6, further comprising:
further prioritizing the set of queries based on an additional prioritization factor.

* * * * *